(12) United States Patent
Goodwin et al.

(10) Patent No.: US 7,685,617 B2
(45) Date of Patent: Mar. 23, 2010

(54) METHOD AND SYSTEM FOR SELECTIVELY AND MULTIPLY ROUTING MEDIA STREAM TO A MEDIA APPLIANCE

(75) Inventors: David C. Goodwin, Holland, PA (US); Thomas L. Du Breuil, Ivyland, PA (US); Peter A. Kindinger, Cary, IL (US); Mark A. Kolber, Churchville, PA (US); Anthony M. Radice, Chalfont, PA (US)

(73) Assignee: General Instrument Corporation, Horsham, PA (US)

( * ) Notice: Subject to any disclaimer, the term of this patent is extended or adjusted under 35 U.S.C. 154(b) by 329 days.

(21) Appl. No.: 11/614,321

(22) Filed: Dec. 21, 2006

(65) Prior Publication Data

US 2008/0151862 A1    Jun. 26, 2008

(51) Int. Cl.
  *G06F 13/00* (2006.01)
  *H04N 5/455* (2006.01)
(52) U.S. Cl. .............................. 725/39; 725/38; 725/40; 725/41; 725/42; 725/43; 725/56; 725/57; 725/59; 725/60; 725/61; 725/110
(58) Field of Classification Search ................... 725/68, 725/71, 78, 85, 100, 131, 139, 151, 37–61, 725/110
See application file for complete search history.

(56) References Cited

U.S. PATENT DOCUMENTS

| | | | |
|---|---|---|---|
| 6,470,497 B1 * | 10/2002 | Ellis et al. | 725/39 |
| 7,380,263 B2 * | 5/2008 | Shintani | 725/59 |
| 2005/0108771 A1 * | 5/2005 | Kim | 725/132 |

* cited by examiner

*Primary Examiner*—Christopher Kelley
*Assistant Examiner*—Alazar Tilahun

(57) ABSTRACT

A method for selectively and multiply routing a media stream input to a media appliance is provided. The method includes receiving the media stream. Further, the method includes distributing the media stream onto a plurality of individual media paths within the media appliance. Furthermore, the method includes routing the media stream on at least a first one of the media paths to a first media processor within the media appliance, while simultaneously routing the media stream on at least one other of the media paths to at least one additional media processor within the media appliance.

14 Claims, 4 Drawing Sheets

METHOD AND SYSTEM FOR SELECTIVELY AND MULTIPLY ROUTING MEDIA STREAM TO A MEDIA APPLIANCE

The present invention generally relates to media appliances, and more particularly, to selectively and multiply routing a media stream to a media appliance.

BACKGROUND OF THE INVENTION

In recent times, the popularity of media content, such as broadcasted videos and news as well as broadcasted songs, has grown significantly. This media content can be viewed on media appliances such as Digital Video Recorders (DVRs), Television (TV) sets, Digital Video Disc (DVD) players/recorders, personal computers, Personal Digital Assistants (PDAs), cellular phones, and digital video cameras. Typically, the media content is broadcasted on different channels. Media appliances scan the channels to check the availability of media content on those channels. Thereafter, the appliances tune on to the channels.

However, the scanning operation can typically take several minutes, or even longer, when the number of channels to be scanned is large. Further, while the scanning operation is being performed on a media appliance, no other operation, including that of viewing media content, can be performed simultaneously. This causes inconvenience to the user of the media appliance.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
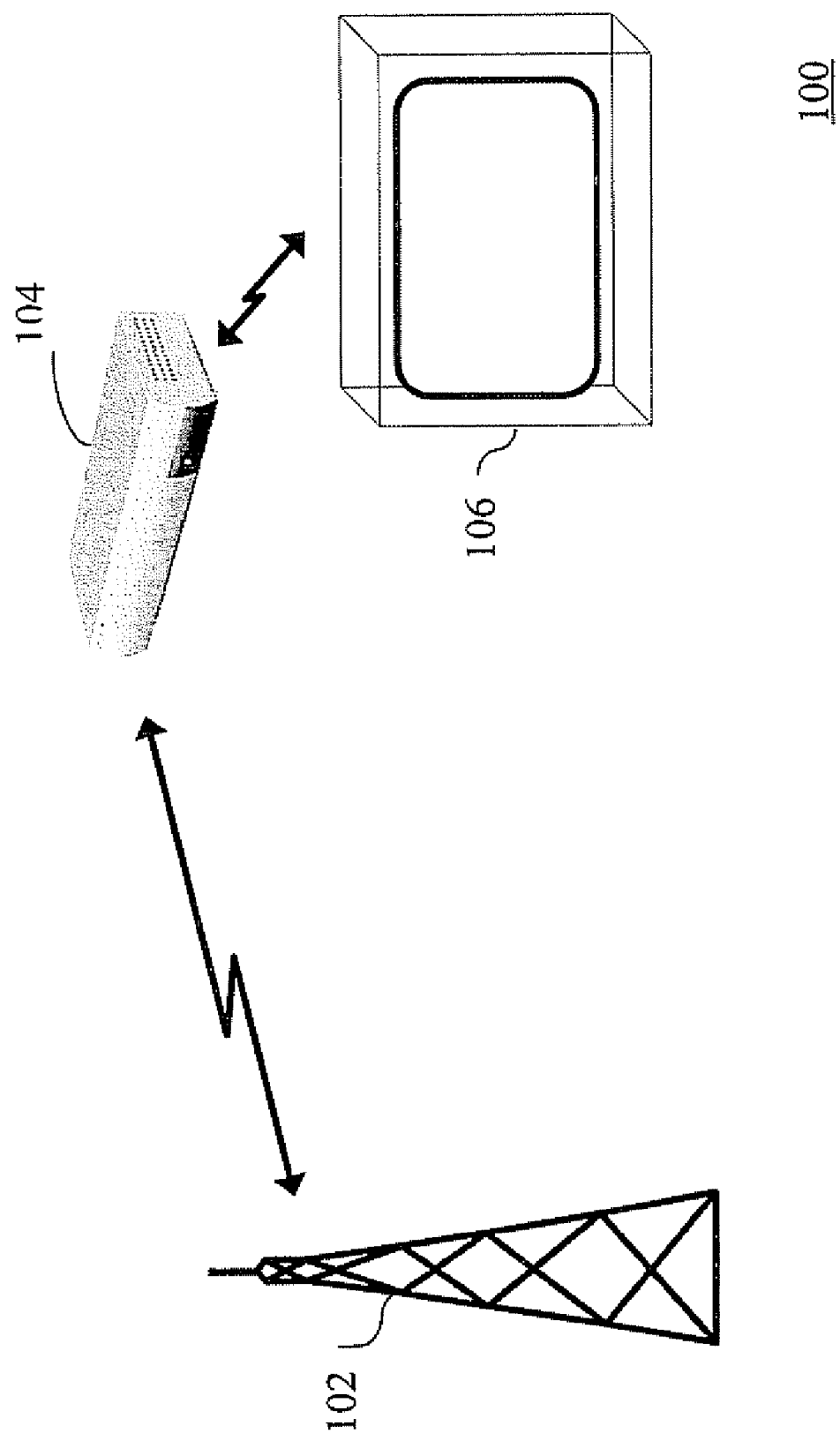
FIG. 1 illustrates an exemplary environment, where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for selectively and multiply routing a media stream to a media appliance, in accordance with various embodiments of the present invention, it should be observed that the present invention resides primarily in combinations of method steps for selectively and multiply routing media streams in a media appliance. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises", "comprising", or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a", does not, without more constraints, preclude the existence of additional identical elements in the process, method, article or apparatus that comprises the element.

A "set", as used in this document, means a non-empty set, i.e., a set that comprises at least one member. The term "another," as used in this document, is defined as at least a second or more. The terms "includes" and/or "having", as used herein, are defined as comprising.

For an embodiment, a method for selectively and multiply routing a media stream to a media appliance is provided. The method includes receiving the media stream. Further, the method includes distributing the media stream to a plurality of individual media paths within the media appliance. Furthermore, the method includes routing the media stream via at least one of the first media stream paths to a first media processor within the media appliance, while simultaneously routing the media stream via at least one other media path to at least one additional media processor within the media appliance.

For another embodiment, a method for routing a plurality of media streams to a media appliance is provided. The method includes receiving each of the plurality of media streams via a separate media path within the media appliance. Further, the method includes routing at least one of the first media streams to a first media processor within the media appliance, while simultaneously routing at least another of the plurality of media streams to at least one additional media processor within the media appliance.

For yet another embodiment, a media appliance is provided. The media appliance is adapted to selectively and multiply route a media stream. The media appliance includes an input terminal for receiving the media stream. Further, the media appliance includes a first media stream path and at least one additional media stream path. Moreover, the media appliance includes a signal distributor that is adapted to simultaneously distribute the received media stream via the first and at least the one additional media stream path. Furthermore, the media appliance includes a first media processor that is coupled to the first media stream path and is adapted to receive and process the media stream distributed via the first media stream path. Further, the media appliance includes at least one additional media processor that is coupled to at least the one additional media stream path. This at least one additional media processor is adapted to receive and process the media stream that is distributed via at least the one additional media stream path.

For yet another embodiment, a media appliance is provided. The media appliance is adapted to selectively route a plurality of media streams. The media appliance includes a first media stream path that is adapted to receive and route a first media stream. Further, the media appliance includes at least one additional media signal path that is adapted to receive at least one additional media stream. Furthermore, the media appliance includes a first media processor that is coupled to the first media stream path and is adapted to receive and process the first media stream. Moreover, the media appliance includes at least one additional media processor that is coupled to at least the one additional media stream path and is adapted to receive and process at least the one additional media stream.

FIG. 1 illustrates an exemplary environment 100, where various embodiments of the present invention can be practiced. The environment 100 includes a broadcaster 102, a media appliance 104, and an electronic device 106. It should be noted that the media appliance 104 and the electronic device 106 are shown as separate entities, only for the sake of clarity. The functions of these entities can be performed by single entity as well.

The broadcaster 102 sends media streams to the media appliance 104. Examples of a broadcaster can include a cable TV broadcaster, a satellite system, an off-air broadcast, and the like. It should be noted that the media appliance 104 is shown as a set-top box for illustrative purposes only. The media appliance 104 is shown to receive an input from the single broadcaster 102. However, the media appliance 104 can receive inputs from more than one broadcaster. The media appliance 104 can receive media streams through a cable, a satellite, and other wired or wireless links. The media streams are processed at the media appliance 104 and are viewed at the electronic device 106. Examples of an electronic device include, but are not limited to, a TV set, a cell phone, a Personal Digital Assistant (PDA), a smart phone, and a laptop. For example, a set-top box can receive a media stream from a cable TV, and send the processed media stream to a television set (TV), so that media content corresponding to the media stream can be displayed.

Figure 2:
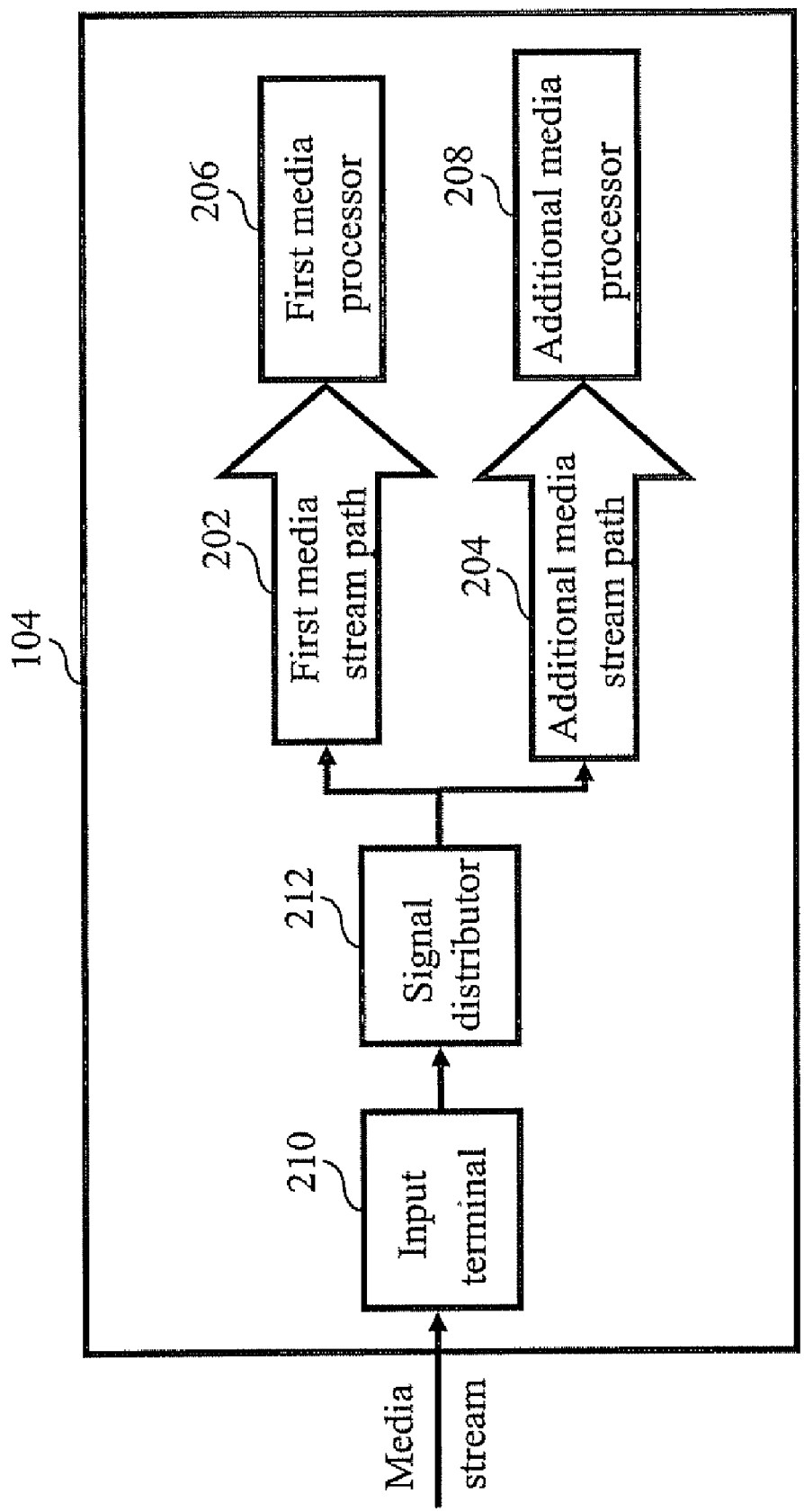
FIG. 2 illustrates a block diagram of a media appliance, in accordance with an embodiment of the present invention.

FIG. 2 illustrates a block diagram of the media appliance 104, in accordance with an embodiment of the present invention. The media appliance 104 is adapted to route a plurality of media streams. The media appliance 104 includes a first media stream path 202, at least an additional media stream path 204 (hereinafter referred to as the additional media stream path 204), a first media processor 206, and at least an additional media processor 208 (hereinafter referred to as the additional media processor 208). In FIG. 2, the media appliance 104 is shown to include the first media stream path 202 and the additional media stream path 204, for the sake of clarity. However, the media appliance 104 can include more than two media stream paths.

The first media stream path 202 can receive and route the first media stream (or a portion of the received media stream). The first media stream can be routed to the first media processor 206 and coupled to the first media stream path 202. The first media processor 206 can receive and process the received first media stream. For an embodiment, the first media processor 206 enables the display of the first media stream. For example, the media stream received at a TV receiver can correspond to various channels being broadcasted by various sources, for example, a cable TV broadcast, a satellite broadcast, and an off-air broadcast. A media stream corresponding to a particular channel can be routed to the first media processor 206 viewed on the TV set.

Simultaneously, an additional media stream (or a remaining portion of the received media stream) is received and routed through the additional media stream path 204. This additional media stream can be routed to the additional media processor 208.

The additional media processor 208 can receive and process the additional media stream distributed on the additional media stream path 204. For the sake of clarity, the media appliance 104 is shown to include a single additional media processor 208. However, the media appliance 104 can include a plurality of media processors, each of which is coupled to separate media stream paths. For an embodiment, the additional media processor 208 tunes the additional media stream, while the first media processor 206 enables the display of media content corresponding to the first media stream.

Channels can be scanned and results stored on a media appliance while another channel is being viewed. For another example, a first additional media processor of the plurality of media processors may be utilized to scan all analog cable TV channels, while a second additional media processor may be used to scan all digital Quadrature Amplitude Modulation (QAM-64) cable TV channels. Further, a third additional media processor may scan digital (QAM-256) cable TV channels. Furthermore, the plurality of media stream processors may be split into subsets of the channels. For example, the available channels may range from 1 to 135. These 135 channels may be split into three subsets, viz., 1 to 45, 46 to 90, and 91 to 135, and each range may be scanned separately for all analog and digital channels by the three media processors. Moreover, each media stream path may route a media stream to the plurality of media processors. Each media processor may alternatively scan the portions of the media stream of all the analog and digital channels. Further, it may be assumed that the lower channel numbers correspond to analog channels and the higher channel numbers to digital channels. Therefore, one or more media processors can first scan the analog channels and then the digital channels at the lower channel numbers. Furthermore, the one or more media processors can first scan the digital channels and thereafter the analog channels at the higher channel numbers.

For an embodiment, the process of scanning the additional media processor 208 can be interrupted by the user channel, to utilize the additional media processor 208 for a purpose such as recording the media content. For example, a user may discover a new channel while scanning is being performed. If the user wishes to record a program that is available on the new channel, the channel being scanned by an additional media processor can be interrupted, so that the additional media processor can be made available to record the program being broadcast on the new channel.

For an embodiment, the channel scan may be performed continuously in the background while a user is viewing a channel, without any input from the user. For another embodiment, the channel scan may be performed periodically. For example, the channels may be scanned every two days. The result of the continuous scan and/or periodic scan can be notified to the media appliance 104 and/or the user of the electronic device 106. For example, as a result of scanning, the user may be notified that a new channel has been added since the channels were last scanned. Further, the operation of a channel scan can be linked to available metadata via the channel. The metadata may provide a useful indication of the result of the channel scan. The result can be displayed to the user, based on the metadata. For example, when a new channel, e.g., HBO® is detected, a message may be displayed on the electronic device 106, indicating that "the HBO® channel has just been added". For an embodiment, the information related to the channel scan can be updated at the media appliance 104, so that an additional media processor may not perform a scan of a channel that has already been scanned by another media processor.

For an embodiment, the media appliance 104 can also include an input terminal 210 for receiving the media stream. The media appliance 104 can receive the media stream from the broadcaster 102. For the sake of clarity, a single input terminal 210 is shown in FIG. 2. However, the media appliance 104 can include more than one input terminal for receiving the plurality of media streams.

The media streams received at the input terminal 210 may include a plurality of channels. These media streams lie in a typical frequency range and may be converted by the tuner to a form that makes them suitable for being supplied to a decoder in the electronic device 106. The tuner can select one of the channels for demodulating and decoding the media streams. For example, there may be 100 to 135 channels, and each of these channels may broadcast five different programs. The tuner enables the selection of the desired channel containing the desired program, for viewing or listening. Further, the decoder decodes the channel to supply the desired media stream, which may then be subjected to further processing. For example, a television signal may be digitally compressed and encoded by using the Moving Pictures Experts Group (MPEG) encoding system. These signals must be decoded and demultiplexed to enable the display of a channel corresponding to the portion of the media stream obtained by routing the media stream on the first media stream path 202.

For an embodiment, the media appliance 104 can include a signal distributor 212, to simultaneously distribute the received media stream to the first media stream path 202 and the additional media stream path 204. For an embodiment, the additional media stream can be stored in the additional media processor 208. For example, while performing the channel scan, the media appliance 104 may discover and store a new channel. Further, the media appliance 104 can store the new channel with a tag attached to it, informing the user that the new channel has been added. The media appliance 104 may also include one or more additional processors, which can be used to perform a scan of the available channels, to map available content channels within at least a portion of the media stream received via the additional media stream path. For example, a user may wish to scan all the analog and digital channels separately. The additional media processor 208 may be enabled to scan the analog channel, and at least one other additional media processor may be enabled to scan the digital channels.

Figure 3:
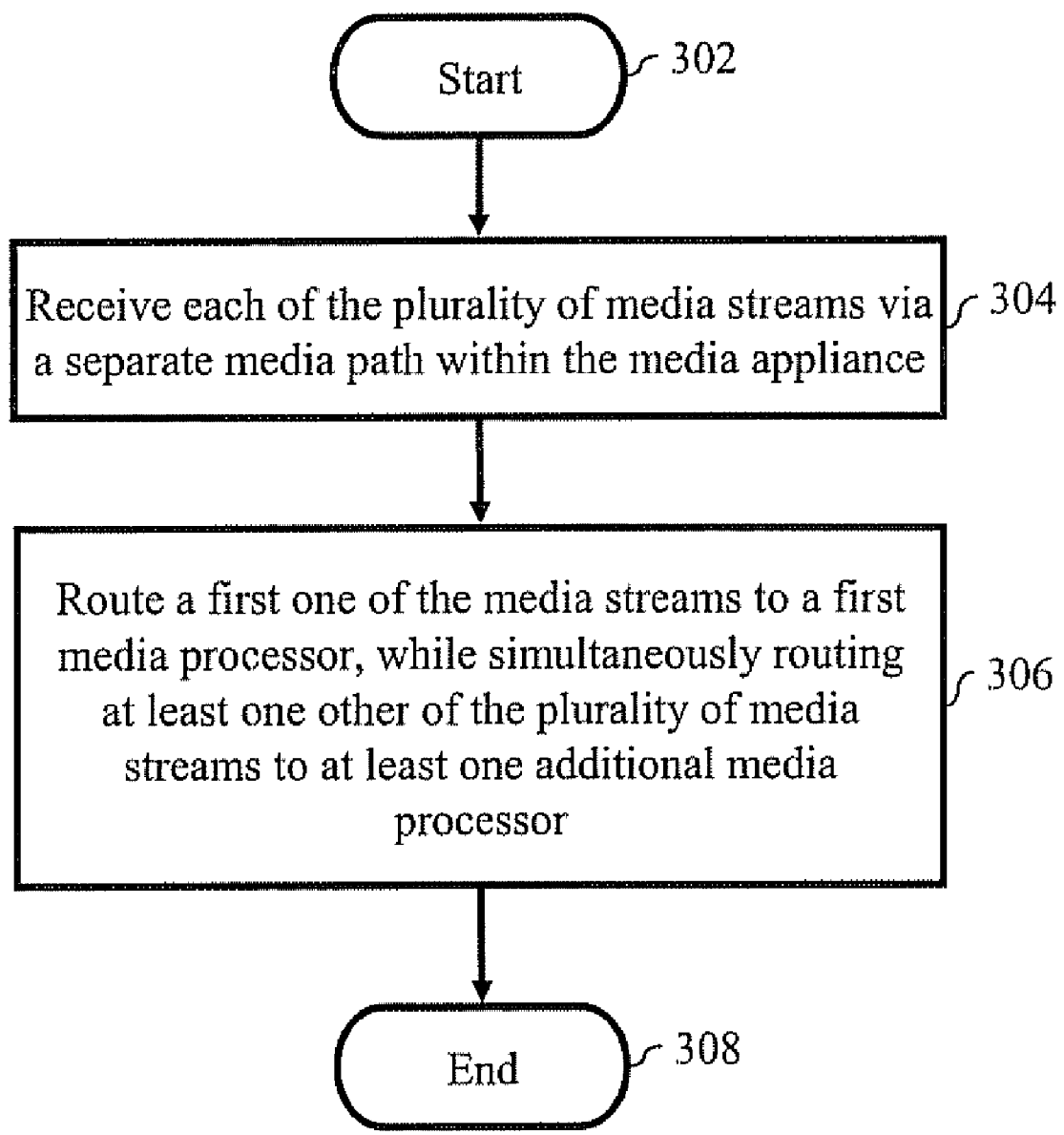
FIG. 3 is a flow diagram illustrating a method for selectively routing a plurality of media streams, in accordance with an embodiment of the present invention.

FIG. 3 is a flow diagram illustrating a method for selectively routing a plurality of media streams, in accordance with an embodiment of the present invention. The plurality of media streams is sent to the media appliance 104 from a source, for example, a cable TV, off-air, and so forth.

The method starts at step 302. At step 304, the media appliance 104 receives each of the plurality of media streams via a separate media path within the media appliance 104. The first one of the media stream, hereinafter referred to as a first media stream, can be received via the first media stream path 202. Further, at least one other of the media streams, hereinafter referred to as an additional media stream, can be received via the additional media stream path 204. For an embodiment, the plurality of media streams are received at the input terminal 210 of the media appliance 104, for example, a set-top box.

At step 306, the first media stream can be routed to the first media processor 206 within the media appliance 104. For example, the media stream received from the cable TV input may be routed to the first media processor 206. The first media stream can be routed over the first media stream path 202. For an embodiment, the first media processor 206 can enable the display of a portion of the first media stream. For example, a user may wish to view a particular channel from the various channels available on his/her TV set.

Simultaneously, the additional media stream can be routed to the additional media processor 208. The additional media stream can be routed over the additional media stream path 204. For an embodiment, the additional media processor 208 enables a user to perform a channel scan to map available content channels within at least a portion of the other media streams. For example, media content available on a channel may be displayed on the electronic device 106, and simultaneously, a channel scan can be performed for the rest of the channels. For an embodiment, the display of the media content corresponding to the first media stream can be enabled by using the first media processor 206, and a channel scan of the rest of the channels can be enabled by using the additional media processor 208.

For an embodiment, the operations of media stream processors, for example, the first media processor 206 and the additional media processor 208, can be controlled as a function of one or more user preferences. For example, a user may wish to perform an auto-scan of channels every 48 hours. Again, a user may choose to scan only analog channels or digital channels. Yet again, the user can choose whether to utilize each of the additional media stream paths to scan, display or record the media content. The additional media processor 208 enables the user to record the program while performing a channel scan on the first media stream. Therefore, the user can watch a channel of his/her choice while performing a background scan of the available channels. Thereafter, the process terminates at step 308.

Figure 4:
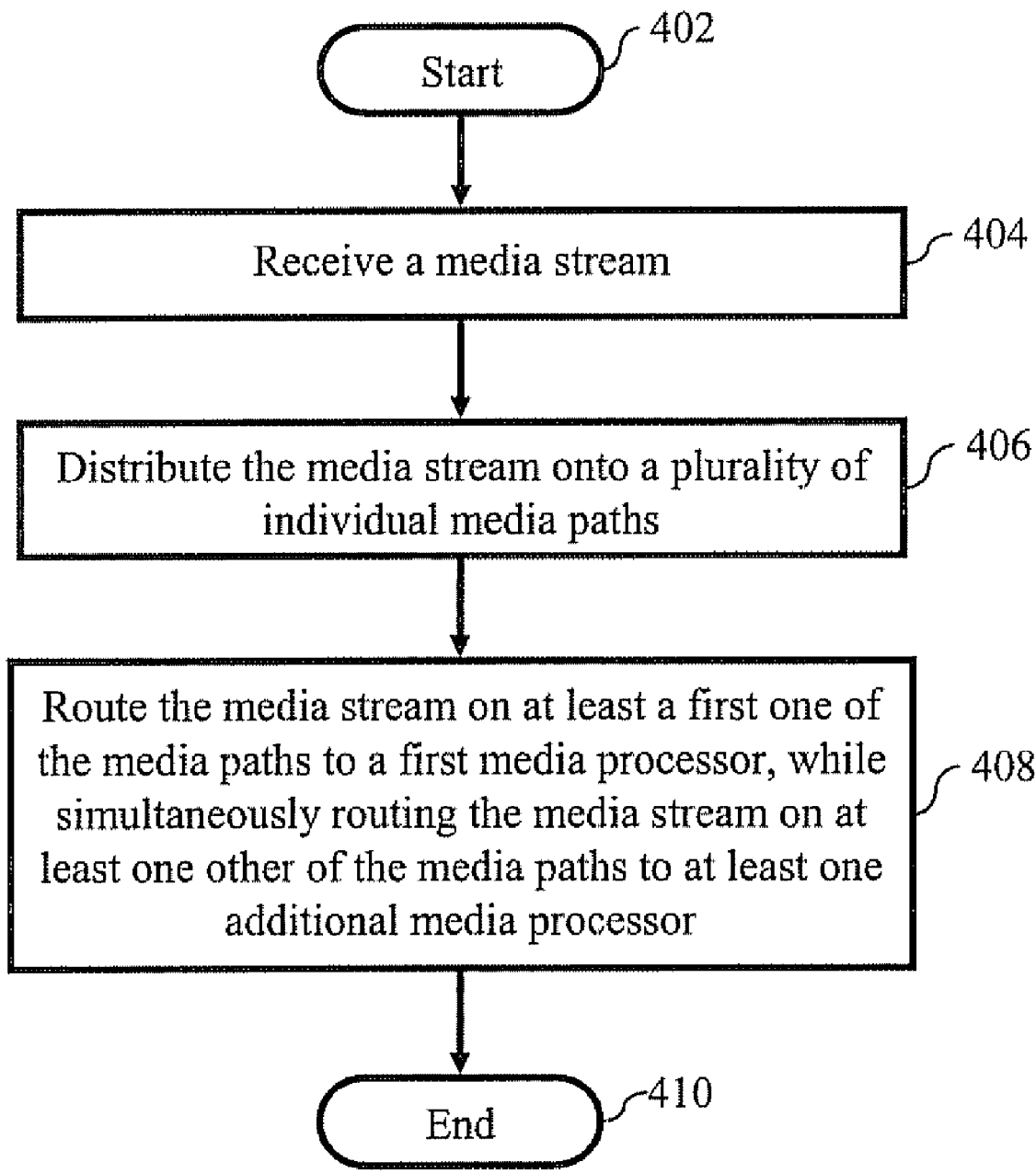
FIG. 4 is a flow diagram illustrating a method for selectively routing a media stream, in accordance with another embodiment of the present invention.

FIG. 4 is a flow diagram illustrating a method for selectively routing a media stream, in accordance with an embodiment of the present invention. The method for routing the received media stream starts at step 402. At step 404, a media stream is received at the media appliance 104. For an embodiment, the media stream is received at the input terminal 210 of the media appliance. At step 406, the media stream is distributed into a plurality of individual media paths. For an embodiment, the media streams can be distributed by the signal distributor 212. The signal distributor 212 simultaneously distributes the portions of the received media stream to a plurality of individual media paths at step 406. The plurality of media stream paths is described to include the first media stream path 202 and the additional media stream path 204. However, the plurality of media stream paths can include more than two media streams paths.

At step 408, the received media stream can be routed on the first media stream path 202 to the first media processor 206 within the media appliance 104. The first media processor 206 can enable the display of at least a portion of the media stream. An example of the first media processor 206 can be a tuner. The tuner converts the received media stream to a form that is easily decoded by the electronic device 106, thereby enabling the display of media content corresponding to the media streams.

Further, the media stream can be routed to at least one of the individual media stream paths, hereinafter referred to as the additional media stream path 204, to the additional media processor 208 within the media appliance 104. Further, the additional media processor 208 processes the media stream. The additional media processor 208 can perform a channel scan of the media stream. For an embodiment, the channel scan may be performed by the additional media processor to map the available content channels within at least a portion of the media stream. For example, the tuner may scan all the available analog channels. Again, the tuner may first scan the analog channels and thereafter the available digital channels. Further, during the channel scan, the one or more processors can cache the relevant data found on that channel. For example, while performing channel scanning, a Moving Pictures Experts Group Packet identifiers (MPEG PIDs) can be found and cached for the audio or video streams. Another example is to store any system information related to that media stream such as "channel name" or "event/program name". For an embodiment, the additional media processor 208 performs a tuning function on at least a portion of the media stream, as already explained in FIG. 2. Thereafter, the process terminates at step 410.

Various embodiments of the method and system for selectively and multiply routing media streams have been described above. Various embodiments of the present invention have significant advantages over the methods and systems that existed in the prior art. The media appliance of the present invention enables the display of any available one or more channels while simultaneously performing a channel scan of the available channels being broadcasted by one or more broadcasters. Further, the present invention enables the scanning of channels as per user preferences. Moreover, the media appliance can update the user on the result of a channel scan. Whenever a new channel is added, as a result of scanning, the user may get a message on the communication device, updating him/her about the result of the channel scan. For an embodiment, the one or more media processors enable a continuous background scan of the available channels while simultaneously displaying the media content. For another embodiment, the background channel scan can occur periodically. This has the advantage that the user can be updated about the result of the channel scan, for example, any new channel that has been added or any channel that has been lost.

It will be appreciated that the method and system for selectively and multiply routing media streams in a media appliance, described herein, may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method to selectively and multiply route a media stream in a media appliance. Alternatively, some or all the functions could be implemented by a state machine that has no stored program instructions, or in one or more application-specific integrated circuits (ASICs), in which each function or some combinations of certain of the functions are implemented as custom logic. Of course, a combination of the two approaches could be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims as issued.

What is claimed is:

1. A method for selectively and multiply routing a media stream input to a media appliance, the method comprising the steps of:
    receiving the media stream;
    distributing the same media stream onto a plurality of individual media stream paths within the media appliance;
    routing the media stream on at least a first one of the individual media paths to a first media processor that enables a display of a portion of the media stream within the media appliance, while simultaneously routing the same media stream on at least one other of the individual media paths to at least one additional media processor that is enabled to tune upon an other portion of the media stream to perform a channel scan to map available content channels within the other portion of the media stream within the media appliance; and
    interrupting the display of the portion of the media stream by the additional media processor to notify a user that, during scanning of the other portion of the media stream, a new channel has been found since a last channel scan.

2. The method of claim 1, wherein a tag for the newly found channel is stored in the media appliance.

3. The method of claim 1, wherein the scanning of the additional media processor is interrupted by the user so that the additional processor is made available to record the new channel upon the other portion of the media stream.

4. The method of claim 1, wherein the at least one additional media processor is enabled to perform the channel scan continuously while the first media processor is displaying a portion of the media stream.

5. The method of claim 1, wherein the at least one additional media processor is enabled to perform the channel scan periodically while the first media processor is displaying a portion of the media stream.

6. The method of claim 1, wherein the scanning is linked to available metadata via the channel.

7. The method of claim 6, wherein a result of the scanning linked to available metadata via the channel is displayed to a user.

8. A media appliance adapted to selectively and multiply route an input media stream, the media appliance comprising:
    an input terminal for receiving the media stream;
    a first media stream path;
    at least one additional media stream path;
    a signal distributor adapted to simultaneously distribute the same received media stream onto the first media stream path and the at least one additional media stream path;
    a first media processor coupled to the first media stream path and adapted to receive and process the media stream distributed onto the first media stream path to display of a portion of the media stream; and
    at least one additional media processor coupled to the at least one additional media stream path and adapted to receive and process the media stream distributed onto the at least one additional media stream path to tune upon an other portion of the media stream to perform a channel scan to map available content channels within the other portion of the media stream, wherein the additional media processor interrupts the first media processor's display of the portion of the media stream to notify a user that, during scanning of the other portion of the media stream, a new channel has been found since a last channel scan.

9. The media appliance of claim 8, wherein the additional media processor stores a tag for the newly found channel in the media appliance.

10. The media appliance of claim 8, wherein the scanning of the additional media processor is interrupted by the user so that the additional processor is made available to record the new channel upon the other portion of the media stream received via the at least one additional media stream path.

11. The media appliance of claim 8, wherein the at least one additional media processor is further adapted to perform the channel scan continuously while the first media processor is displaying a portion of the media stream.

12. The media appliance of claim 8, wherein the at least one additional media processor is enabled to perform the channel scan periodically while the first media processor is displaying a portion of the media stream.

13. The media appliance of claim 8, wherein the scanning is linked to available metadata via the channel.

14. The media appliance of claim 13, wherein a result of the scanning linked to available metadata via the channel is displayed to a user.

* * * * *